United States Patent [19]

Ruth et al.

[11] 4,272,458
[45] Jun. 9, 1981

[54] TAMPER RESISTANT IDLE ADJUSTMENT SCREW

[75] Inventors: Harvey L. Ruth, St. Louis; Michael B. Phelan, Florissant, both of Mo.

[73] Assignee: ACF Industries, Incorporated, New York, N.Y.

[21] Appl. No.: 92,756

[22] Filed: Nov. 9, 1979

[51] Int. Cl.³ .............................................. F02M 3/08
[52] U.S. Cl. ................................... 261/23 A; 261/71; 261/DIG. 38; 137/382
[58] Field of Search .............. 261/DIG. 38, 41 D, 71, 261/23 A; 137/382

[56] References Cited

U.S. PATENT DOCUMENTS

| 1,541,801 | 6/1925 | Durning | 137/382 |
| 2,618,473 | 11/1952 | Whitford | 261/DIG. 38 |
| 2,740,130 | 4/1956 | Stone | 137/382 |
| 3,199,121 | 8/1965 | Greto | 137/382 |
| 4,120,918 | 10/1978 | Codling | 261/41 D |

FOREIGN PATENT DOCUMENTS

| 2401803 | 9/1974 | Fed. Rep. of Germany | 261/DIG. 38 |
| 2548226 | 5/1976 | Fed. Rep. of Germany | 261/DIG. 38 |
| 2634441 | 2/1977 | Fed. Rep. of Germany | 261/DIG. 38 |
| 46475 | 3/1909 | Switzerland | 261/DIG. 38 |
| 231366 | 4/1925 | United Kingdom | 261/DIG. 38 |

Primary Examiner—Tim R. Miles
Attorney, Agent, or Firm—J. Joseph Muller

[57] ABSTRACT

A carburetor improvement inhibits tampering with an idle adjustment screw after an initial adjustment of the screw is made. The improvement comprises a cover attachable to the carburetor which prevents access to the idle adjustment screw.

2 Claims, 3 Drawing Figures

TAMPER RESISTANT IDLE ADJUSTMENT SCREW

BACKGROUND OF THE INVENTION

This invention relates to temperproofing of a carburetor and, more particularly, to making the idle adjustment mechanism of the carburetor tamper resistant.

As a step toward reducing pollution caused by automobile engines, various portions of a carburetor are now required to be tamperproofed. This is done to prevent adjustments in carburetor operation after the carburetor has been adjusted to baseline specifications during manufacture. Since these baseline specifications are established, inter alia, with keeping engine exhaust emissions to a minimum, it is expected that by preventing later adjustments to the carburetor, engine exhausts will be kept to a minimum.

SUMMARY OF THE INVENTION

Among the several objects of the present invention may be noted that provision of tamper resistant means for inhibiting adjustment of a carburetor's idle setting; the provision of such tamper resistant means by which later adjustment of carburetor idle, after an initial adjustment is made, is prevented; and the provision of such tamper resistant means which is quickly and easily installed on the carburetor during its manufacture.

Basically, the improvement of the present invention comprises means for making an idle adjustment screw for a carburetor idle fuel circuit tamper resistant to prevent further adjustment of the screw after an initial adjustment has been made. The initial adjustment of the fuel adjustment means provides an air-fuel mixture conducive to low engine emissions during engine idle speed operation. The means comprises a cover attachable to the carburetor to enclose the idle adjustment screw and inhibit access thereto. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 2:
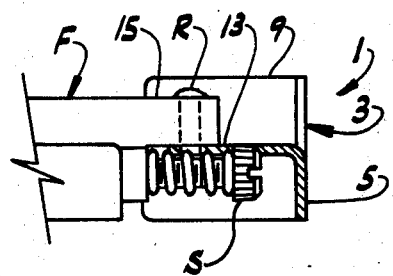
FIG. 2 is a side elevational view, partially in section, of the cover.

Referring to the drawings, a carburetor C has a flange F attachable to an internal combustion engine E. Carburetor C has at least one and may have two air passages AP (see FIG. 3) through which air is drawn into engine E. Each air passage has an associated idle fuel circuit (not shown) through which fuel is delivered to each passage to mix with air and form an air-fuel mixture combusted in the engine. Operation of idle speed fuel circuits are well known in the art. A spring-loaded idle adjustment screw S is used to adjust the vacuum signal to which each idle fuel circuit is subjected, adjustment of the screw making the mixture richer or leaner. Each screw S is a slot-headed screw (as shown in FIG. 2) which when turned in one direction or the other admits more or less air into the fuel circuit thus to vary the vacuum signal on the circuit. Typically, carburetor C is mounted on a flow stand during part of its manufacturing process and each screw S is adjusted until the idle speed mixture produced has a specified air-fuel ratio. This baseline value reflects certain engine operating parameters at idle speed. Important among these parameters is minimal engine exhaust emissions.

In the past, screws S, because of their accessibility, have been readily adjustable by an operator of a vehicle in which carburetor C is installed. Because of this, the idle speed mixture can be changed so the engine exhaust emissions are relatively higher than those the engine would produce if the initial adjustment of the screws were maintained.

Figure 3:
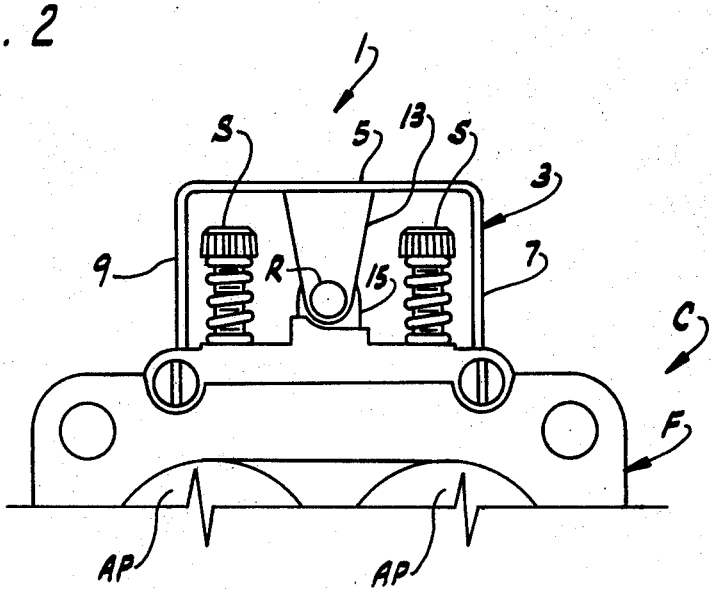
FIG. 3 is a bottom plan view of a portion of a carburetor illustrating attachment of the cover to the carburetor.

The improvement of the present invention comprises means 1 for making an idle adjustment screw S tamper resistant after an initial adjustment of the screw has been made. Means 1 comprises a hardened cover 3 attachable to carburetor C. Cover 3 is U-shaped and (as shown in FIG. 3) is designed to enclose both idle adjustment screws. Cover 3 has a base section 5 with two forward extending side arms 7 and 9 respectively. The length of these side arms is such that when cover 3 is attached to a carburetor, the forward end of the arms abut the body of the carburetor.

Figure 1:
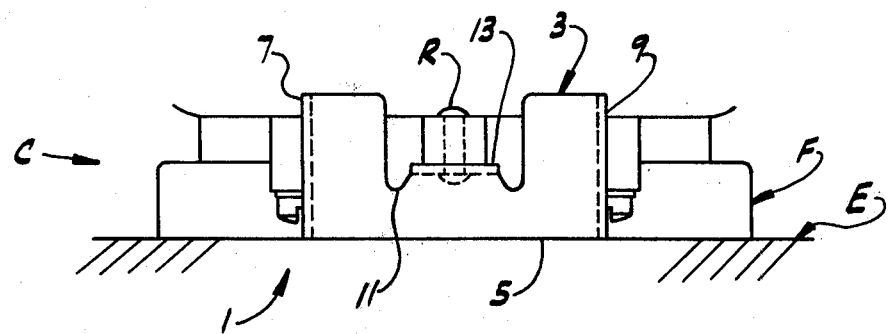
FIG. 1 is an elevational view of a portion of a carburetor illustrating an idle adjustment screw cover comprising the improvement of the present invention.

As shown in FIG. 1, base section 5 has a central portion 11 of lesser height than the outer portions of the base section. A tang 13 extends forwardly or inwardly from central portion 11. The tang has a triangular shape with a rounded forward end. A ledge 15 is cast in flange F when it is formed and the forward end of the tang is secured to the underside of this ledge with a rivet R. It will be understood that other suitable means of attachment besides riveting may be used. As best shown in FIG. 1, the height of central portion 11 is such that when the cover is attached to carburetor C, the bottom of the cover is flush with the bottom of the carburetor.

When installed on carburetor C, the cover renders idle screws S inaccessible to someone wanting to tamper with their settings. The portion of carburetor C above flange F extends back over a portion of cover C and the space between this portion of the carburetor and the cover is such that one cannot bring a tool such as a screwdriver to bear on the screw. Similarly, one cannot get at a screw from beneath the cover because the bottom of the cover sits on top of engine E. Further, one cannot remove cover C by knocking the top off of rivet R because the rivet must be removed from beneath in order to remove the cover. Thus, one wanting to remove the cover must first unmount the carburetor from the engine.

In view of the above, it will be seen that the several objects of the invention are achieved and other advantageous results obtained.

As various changes could be made in the above constructions without departing from the scope of the invention, it is intended that all matter contained in the above description and shown in the accompanying drawings shall be interpreted as illustrative and not in a limiting sense.

What is claimed is:

1. In a carburetor for an internal combustion engine, the carburetor having two air passages and two idle speed fuel circuits, each fuel circuit respectively supplying fuel to one of the air passages to mix with air and form a mixture combusted in the engine, an adjustable idle screw for each idle fuel circuit for respectively varying the quantity of fuel drawn through each idle fuel circuit and thus the fuel to air ratio of the mixture produced, the improvement comprising means for making the idle adjustment screw tamper resistant after an initial adjustment of the screw has been made, said means comprising a cover attachable to the carburetor, the cover enclosing both idle adjustment screws when installed on the carburetor, the cover being U-shaped with a base section and two side arms, the forward end of each side arm abutting the body of the carburetor when the cover is attached thereto and the base section having a central portion of lesser height than the outer portions of the base section and a tang extending inwardly from this central portion, the tang being attached to the carburetor.

2. The improvement as set forth in claim 1 wherein the height of the central portion is such that when the tang is attached to the carburetor, the bottom of the cover is substantially flush with the bottom of the carburetor.

* * * * *